United States Patent
Weisser

(10) Patent No.: US 8,262,298 B2
(45) Date of Patent: Sep. 11, 2012

(54) METHOD FOR REPAIRING A DAMAGED COMPOSITE COMPONENT HAVING FIBRE OPTICS

(75) Inventor: Alexander Weisser, Bremen (DE)

(73) Assignee: Airbus Operations GmbH, Hamburg (DE)

(*) Notice: Subject to any disclaimer, the term of this patent is extended or adjusted under 35 U.S.C. 154(b) by 240 days.

(21) Appl. No.: 12/638,445

(22) Filed: Dec. 15, 2009

(65) Prior Publication Data

US 2010/0140217 A1    Jun. 10, 2010

Related U.S. Application Data

(63) Continuation of application No. PCT/EP2008/058249, filed on Jun. 27, 2008.

(60) Provisional application No. 60/937,926, filed on Jun. 29, 2007.

(30) Foreign Application Priority Data

Jun. 29, 2007    (DE) .......................... 10 2007 030 025

(51) Int. Cl.
   *G02B 6/255* (2006.01)
   *B32B 43/00* (2006.01)
   *B44C 1/22* (2006.01)

(52) U.S. Cl. ............... 385/99; 216/33; 156/98; 156/349

(58) Field of Classification Search ................. 385/12, 385/88, 95–99, 134–135; 216/33; 156/98, 156/349

See application file for complete search history.

(56) References Cited

U.S. PATENT DOCUMENTS

| | | | | |
|---|---|---|---|---|
| 4,428,992 A * | 1/1984 | Street ........................... 428/114 |
| 6,149,749 A * | 11/2000 | McBroom ..................... 156/94 |
| 6,656,299 B1 * | 12/2003 | Grosskrueger et al. ....... 156/98 |
| 2002/0136498 A1 | 9/2002 | Aldridge |
| 2002/0154848 A1 | 10/2002 | Shimonaka |
| 2007/0122098 A1 | 5/2007 | Menendez |
| 2007/0122099 A1 | 5/2007 | Menendez |

FOREIGN PATENT DOCUMENTS

| | | |
|---|---|---|
| DE | 10102853 B4 | 1/2002 |
| WO | WO 2007/003880 A | 1/2007 |
| WO | WO 2009/003933 | 1/2009 |

OTHER PUBLICATIONS

German Office Action for DE 10 2007 030 025.7 dated Jan. 8, 2008.
International Search Report with Written Opinion from PCT/EP2008/058249 dated Sep. 22, 2008.

* cited by examiner

*Primary Examiner* — Daniel Petkovsek

(74) *Attorney, Agent, or Firm* — Jenkins, Wilson, Taylor & Hunt, P.A.

(57) ABSTRACT

The invention is directed to a method for repairing a damaged composite fiber component of an aircraft having at least one integrated fiber optic, the damaged area including both a damaged composite structure and a damaged optical fiber, comprising mechanically removing material from the damaged area, to form a removed area, exposing ends of the damaged composite fiber component in an edge area of the removed area, splicing-in a bridging fiber optic portion for restoring an optical connection, laying the bridging fiber optic along an edge area of the removed area, and pressing and gluing-in a repair patch into the removed area.

10 Claims, 3 Drawing Sheets

METHOD FOR REPAIRING A DAMAGED COMPOSITE COMPONENT HAVING FIBRE OPTICS

CROSS-REFERENCE TO RELATED APPLICATIONS

This application is a continuation of PCT International Application No. PCT/EP2008/058249 filed Jun. 27, 2008, which claims the benefit of U.S. Provisional Application No. 60/937,926, filed Jun. 29, 2007 and German Patent Application No. 10 2007 030 025.7, filed Jun. 29, 2007, the entire disclosures of which are herein incorporated by reference.

FIELD OF THE INVENTION

The invention relates to a method, in particular for repairing a damaged area of a composite fibre component of an aircraft, the composite fibre component having at least one integrated fibre optic.

The invention also relates to a device for exposing a fibre optic integrated in a composite fibre component.

DE 101 02 853 B4 discloses a laser protected, selective material removal process for composite fibre plastics, and WO 2007/003880A discloses a method for repairing damaged areas of composite fibre materials of an aircraft.

In modern aircraft manufacture composite fibre components are widely used to reduce weight. Such composite components are preferably formed with carbon fibre reinforced epoxy resins. Alternatively, other plastic materials can be used to embed the reinforcing fibres and/or reinforcing fibres, for example glass fibres, aramide fibres, ceramic fibres or the like, in order to create a reinforcing fibre arrangement.

To monitor the mechanical integrity of the composite fibre components glass fibres, for example, are increasingly also being integrated into the composite fibre components. This makes it possible, for example, to detect fatigue fractures or cracks due to local mechanical overloading in the composite components at an early stage during operation in an automated fashion. Moreover, glass fibres integrated in the composite fibre component can be used to transmit large quantities of information inside the aircraft, thereby achieving a considerable reduction in the cost of conventional wiring.

Mechanical damage of such composite fibre components, which may be caused, for example, by impact from stones, bird strike or the like, has so far presented a major problem. For example, if the composite component is damaged by impact from stones, there is also a risk that the glass fibres integrated therein will be damaged, in particular severed. In such a situation it is of paramount importance to have a repair method available that enables such damage to be repaired. In this case the repair will be carried out outside the production centres of the aircraft manufacturer and also conveniently using simple devices. It is particularly advantageous for such repairs to be carried out, if necessary, in "in field" applications.

SUMMARY OF THE INVENTION

The object of the invention is therefore to provide a method and a device whereby a repair of damaged composite fibre components with integrated fibre optics is possible.

This object is achieved by a method with the steps according to claim 1.

This also makes it possible for the first time, manually and at relatively little cost, even in "in-field" operation, to repair damage to a composite fire component with integrated fibre optics resulting in at least partial severing of the fibre optic. The fibre optic integrated in the composite fibre component, which generally comprises at least one discrete glass fibre with a diameter of between 50 µm and 150 µm, runs together with the carbon fibres generally used as a reinforcing fibre arrangement, inside the resin matrix of the composite material. The fibre optic can also be woven, twisted or threaded with the reinforcing fibre optic. The glass fibre or fibre optic (so-called Fibre Bragg Grid Sensors ("FGBS")) exhibits, at defined distances, density distances which represent a grid. In the case of a slight extension of the glass fibre by forces acting from outside on the CFRP component, the grid distance between these density zones varies, as a result of which the frequency of light introduced into the fibre also varies. These frequency displacements can be evaluated by measurement for the qualitative recording of a variation in the length of the CFRP component.

In a first working step the damaged composite fibre component, or the damaged area thereof, is fully removed.

The damaged area can be removed, for example, by grinding, shaving, milling, polishing, planning or blasting. In this case an edge area of the damaged area is thickened to achieve better transmission of forces to a repair patch to be glued into this area later so that an accurate fit is obtained. The thickening ratio at which the edge areas of the removed area are thickened is approximately approx. 1:100 for composite CFRP materials, thereby allowing a sufficient enlargement of the gluing surface. The base area of the removed area is generally flat and has a square or rectangular shape. The removed area may also have a base area that deviates from the square or rectangular shape.

In a second method step the preparation of the fibre optic takes place in an edge area of the damaged area. The fibre optic is preferably exposed by a chemical etching method using sulphuric acid and hydrogen peroxide ($H_2O_2$) if the composite fibre component is formed with carbon fibres embedded in an epoxy resin. The preferred temperature of use of the hydrogen peroxide is of the order of 350° C.

Due to the action of the sulphuric acid the resin matrix is converted to small lumps of tar (carbon lumps), which are then oxidised, and hence removed, by the hot hydrogen peroxide. The carbon fibres are not attached by the hydrogen peroxide. Instead of sulphuric acid or in combination with sulphuric acid nitric acid may also be used to etch free the fibre optic, if necessary. The repair process may only be carried out on a load-free CFRP component regardless of the exposure process used for the fibre optic.

In principle a multiplicity of organic and/or inorganic acids are considered for the method. In the case of composite fibre components which are formed with other plastic materials it may be necessary to use other acid systems or a combination of at least two different acids. Due to the action of the sulphuric acid at least the duroplastic epoxy resin matrix is completely dissolved in the area of the fibre optic, whilst the carbon fibres and the fibre optic are not generally attacked. However, the carbon fibres can easily removed by carefully breaking them off so that the fibre optic, which generally comprises a discrete glass fibre, projects from the thickened edge area over a length adequate for the splicing process. The fibre optic is exposed by the etching process so far out of the surrounding resin matrix that a sufficient fibre length is available for the subsequent splicing process. Alternatively the so-called plasma etching process may also be used for exposing the fibre optic. A bridging fibre optic is then spliced to restore the optical connection. The fibre optic is spliced with the bridging fibre optic by the methods known particularly from communications engineering. A glass fibre of the same type that is also used in the fibre optic of the damaged composite fibre component is generally used for the bridging fibre optic. After the epoxy resin matrix is etched away in sections in the area of the fibre optic to be exposed, further cleaning and/or chemical neutralisation of the working area may be necessary. The repair fibre optic can be laid along the edge area or can be guided directly through the removed area over the shortest distance between the ends of the fibre optic exposed on both sides. If necessary the bridging fibre optic can be pre-fixed inside the removed area by gluing in sections. In a final working step a repair patch is glued into the removed damaged area, the patch preferably being inserted seamlessly onto the removed damaged area without the formation of cavities. For this purpose the repair patch has a shape which ideally corresponds exactly to the geometric shape of the removed area.

In a further development of the method, and after the damaged area of the composite fibre component is removed, generally by mechanical means, the area concerned is activated or cleaned to improve the adhesion of the repair patch to be glued in. The activation can be carried out by means of well-known mechanical, chemical methods or a combination thereof. For improving adhesion for the subsequent gluing, the surface can be activated, for example, by grinding, polishing, blasting, chemical processes or the like.

A further advantageous embodiment of the method provides for the fibre optic to be exposed selectively, i.e. spatially closely confined around the fibre optic. The selective exposure is carried out, in particular, by means of a chemical etching method or process in which the area to be etched is exposed by an etching fluid, e.g., sulphuric acid, nitric acid, fluoric acid or any combination of organic and inorganic acids. Alternatively a material removing, plasma supported, gas-chemical (etching) method (so-called plasma etching method) can also be used.

A further advantageous embodiment of the method provides for the bridging fibre optic to be formed preferably with optical fibres laid along the edge area. Because the repair fibre optic is laid on the peripheral, thickened edge area of the removed damaged area, the gluing area can also be monitored simultaneously and the integrity of the adhesion during operation can therefore be guaranteed. If necessary, additional sensors must be provided in the repair fibre optic if necessary. Alternatively it is possible to lay the repair fibre optic over the shortest distance directly through the removed area, which is generally formed by a straight line.

If necessary the repair fibre optic can be pre-fixed on the thickened edge area before the repair patch is inserted in the removed area by gluing. In this case use is preferably made of an adhesive which achieves good adhesion on the resin matrix of the composite component. The same settable epoxy resin that is used to form the resin matrix of the composite fibre component is generally used as the adhesive.

Furthermore, the mechanical removal of the damaged area may be carried out so that a narrow bridge remains which runs from the edge area to approximately the centre of the removed area. The fibre optic embedded in this narrow bridge is then exposed from the surrounding resin matrix by means of the etching process. This initially enables a relatively long section of the fibre optic can be exposed by purely mechanical means. Moreover, the largest proportion of the material can be removed by conventional mechanical removal methods (grinding, rasping, shaving, polishing, blasting) until the fibre optic is embedded in bridge, which is then only a few millimeters wide but may, under certain circumstances, is still up to several centimeters high, depending on the material thickness of the composite fibre component. Only the last exposure step takes place in this case by means of the relatively slow and hence time-consuming etching method. The procedure for working out the bridges is repeated for the opposing edge area. component. Only the last disclosure step takes place in this case by means of the relatively slow and hence time-consuming etching method. The procedure for working out the bridges is repeated for the opposing edge area.

In addition, the object of the invention is achieved by a device, in particular a repair stick, according to claim 8.

Because the repair stick has a first and second container connected by a valve, and a contact body connected to the second container by a pipe can be positioned in the area of the fibre optic of the composite fibre component to be exposed in order to create a sealed area of influence, the (etching) fluid contained in the second container for carrying out the inventive etching process acts selectively on the surface area of the composite fibre component defined by the contact body and limited in itself. The liquid contained in the second container is preferably sulphuric acid in the case of composite fibre components which are formed with epoxy resin reinforced carbon fibres. At least the epoxy resin matrix surrounding the carbon fibre reinforcing arrangement is dissolved by the sulphuric acid in a chemical etching process to that generally only the carbon fibres and the fibre optics remain behind in the area of influence of the contract body. Because the carbon fibres are broken up the fibre optics can then be prepared out of them so that the bridging fibre optic can be spliced for repair purposes by means of a subsequent splicing process.

The bottom of the second container is preferably designed as a membrane that can be penetrated to create a "valve". To facilitate the penetration process the pipe connected to the contact body is provided at the end with a dome or tip which pierces the membrane when the pipe is inserted in the second container, thereby making a connection between the second container and the contact body.

The first container contains a lye which serves only for chemical neutralisation of the acid contained in the second container. The quantity of lye contained in the first container is dimensioned approximately so that when the lye and acid are fully mixed, neutralisation of the quantity of acid contained in the second container is achieved in the ideal case. By opening the valve, which is arranged between the first and second container, only the neutralisation process is initiated to complete the etching process.

In order to control the degree of neutralisation the lye in the first container can be mixed with the optical pH indicator. Furthermore, the valve, in contrast to the (membrane) penetrating valve, is again displaceable so that the neutralisation can take place by way of a "titration". In this case small defined volumes of the lye can be discharged into the second container and hence into the contact body by alternately opening and reclosing the valve for a short time, thus enabling the desired neutral pH value of approximately "7" to be set precisely to complete the exposing process of the fibre optic in the working area.

The contact body is formed with an acid resistant, elastic rubber material which is designed roughly in the shape of a bell. The lower peripheral edge of the contact body, which rests on a composite fibre component, has at least one elastic rubber lip. The spatial area of influence (working area) of the acid on the zone of the composite fibre component to be freed from the epoxy resin matrix for exposing the fibre optic is defined by the contact body and uncontrolled escape of acid beyond the actual working area is reliably prevented.

In the case of carbon fibre reinforced epoxy resins, sulphuric acid is generally the chemical most suitable for exposing the fibre optic by etching away the epoxy resin matrix. Other plastic materials and/or reinforcing fibres may require other acid systems or a combination of at least two organic and/or inorganic acids to achieve exposure of the fibre optic from the surrounding plastic material.

Further advantageous embodiments of the inventive device are explained in the following claims.

BRIEF DESCRIPTION OF THE DRAWINGS

In the drawing:

FIG. 5 shows the removal area of the damaged point in the composite component with a repair fibre optic running in the edge area and spliced in, together with a repair patch to be glued in.

DESCRIPTION OF EXEMPLARY EMBODIMENTS

Figure 1:
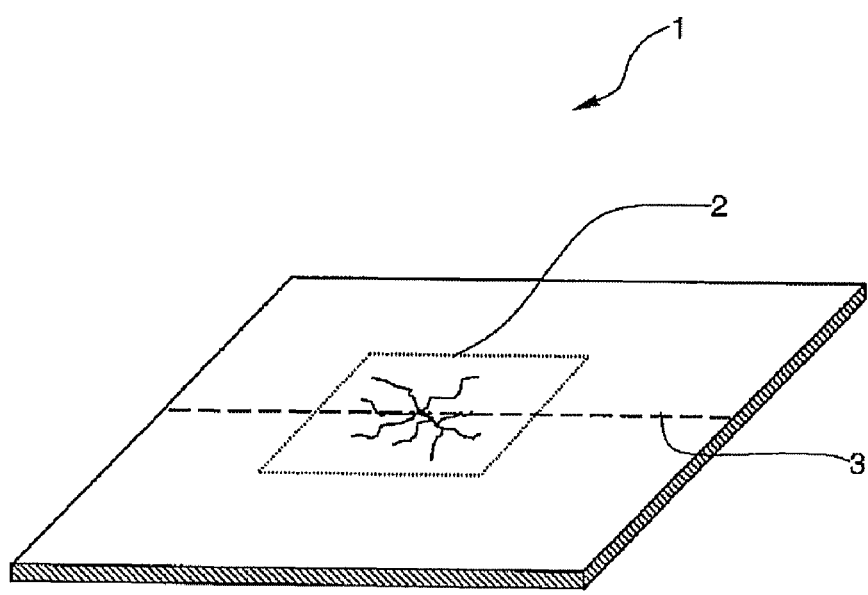
FIG. 1 shows a perspective view of a composite fibre component with integrated damaged fibre optic.

In the drawing the same structural elements are denoted by the same reference numbers.

FIG. 1 shows a composite fibre component 1 of an aircraft with a damaged area 2, which has a multiplicity of cracks. The damage in composite fibre component 1 may, for example, have been caused by the impact of foreign bodies (so-called "impact"). The composite fibre component is formed in a known manner with a carbon fibre reinforced settable epoxy resin.

A fibre optic 3 is embedded or integrated in composite fibre component 1. Fibre optic 3 preferably comprises at least one glass fibre with a diameter of less than 100 μm. Fibre optic 3 serves, for example, to record mechanical loads and result performances of composite fibre component 1 and/or for the detection of crack formation resulting from fatigue phenomena. In addition a multiplicity of control information can be transmitted reliably inside the aircraft with the fibre optic.

In a first method step damaged area 2 is preferably removed purely mechanically. As can be seen from the representation in FIG. 2, a removed area 4 of composite fibre component 1 has an approximately rectangular base area 5. An edge area 6 of removed area 4 is thickened, i.e. the surfaces of edge area 6 form an angle of inclination of less than 45° to base area 5 of removal area 4. This enlarges the total area that is available for gluing in a repair patch not shown in FIG. 2. This surface enlargement of removed area 4 is assigned decisive importance because the final strength of composite fibre component 1 must not be appreciably reduced in damaged area 2 by the gluing in of a repair patch, and the adhesive used to repair carbon fibre reinforced epoxy resins generally attains a maximum adhesive strength of 5 N/mm². The mechanical loading capacity of a glued surface, which is lower than a solids material, necessitates a surface enlargement of the glued area, by thickening for example.

Damaged area 2 is preferably removed by mechanical means. In this case the removal can be carried out by grinding, planning, rasping, blasting, shaving, polishing or the like using suitable tools. No particular consideration need be given to fibre optic 3 running in this area since it is already damaged and can therefore be removed without residue without further disadvantages. Alternatively, damaged area 2 can also be removed by (more time-consuming) chemical means.

After removal of damaged area 2 an intermediate step may then follow in the form of a cleaning operation in which any remaining coolant or grinding compound residues are removed from base area 4 and edge area 6 to improve the adhesion of the repair patches to be glued in.

Figure 3:
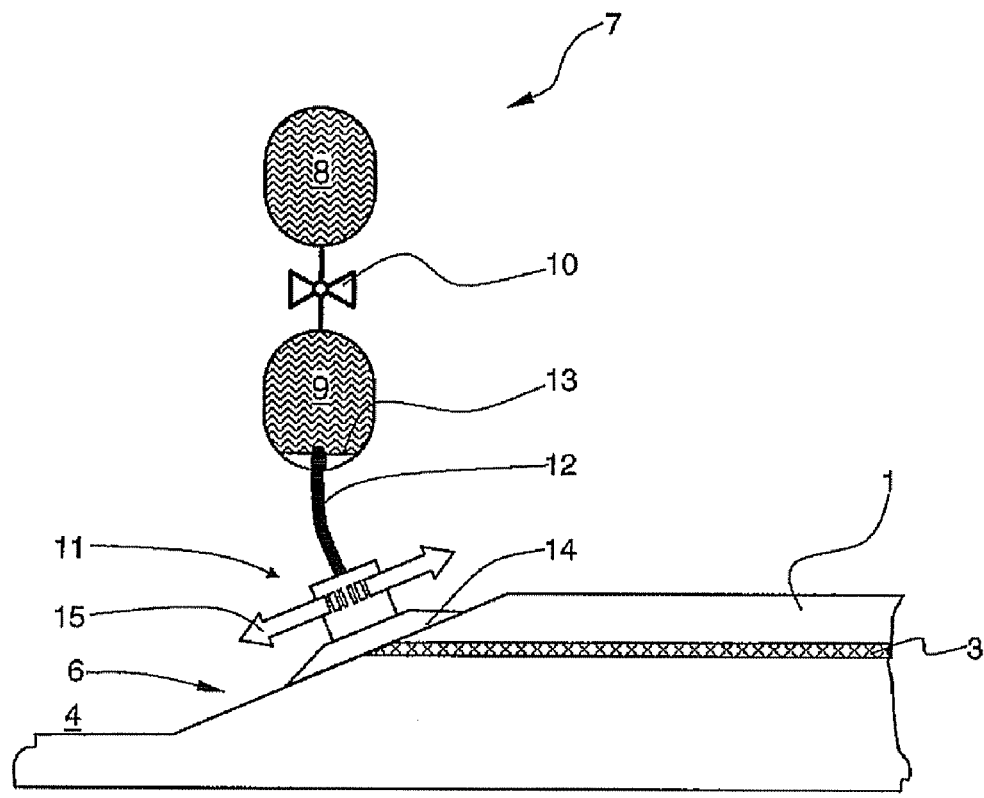
FIG. 3 shows an enlarged section from FIG. 2 with a repair stick for removing the resin matrix of the composite component in the area of the fibre optic by chemical etching.

In a further working step fibre optic 3 from composite fibre component 1 is successively exposed by means of a device that can be handled manually and is designed as a repair stick, as shown in FIG. 3. Repair stick 7 is placed in edge area 6, to be machined, of removed area 4 in an outlet area of fibre optic 3.

Repair stick 7 comprises a first container 8 and a second container 9, which are connected to a reclosable valve 10. A contact body 11 is connected by a pipe 12 to second container 9. Pipe 12 may, for example, be designed as an acid resistant, flexible pipe or an elastic hose pipe. Pipe 12 may have, at its end pointing toward second container 9, a tip, a dome or the like to facilitate penetration of membrane 13. To initiate the chemical removal process pipe 12 is inserted by a user into lower container 9. In this case a membrane 13 is pierced so that the fluid contained in second container 9 flows through pipe 12 into contact body 11 and can therefore act on the surface of edge area 6.

First container 8 contains a lye which is provided solely for neutralising the acid contained in container 9. The acid contained in second container 9 is preferably highly concentrated sulphuric acid in the case of composite fibre components which are formed with carbon fibre reinforced epoxy resins. Composite fibre components 12 which are formed with other resin systems and/or other fibre types require, if necessary, a different acid or a combination of organic and inorganic acids. To accelerate the removal process second container 9 may have a heating device for tempering the acid.

The quantity of the lye provided in first container 8 is dimensioned so that when the lye has discharged completely from first container 8 into second container 9 and contact body 11, by opening valve 10, almost complete neutralisation of the sulphuric acid is achieved in the ideal case. In this case a pH value of approximately "7" is established in the mixed fluids. A "titration" can also be carried out by means of reclosable valve 10, where small volumes of the lye are fed to lower container 9 from first container 8 by repeated opening and closing of valve 10, thereby ensuring very accurate setting of a desired pH value of the mixed fluids and hence of the residual acid content in the edge area 6.

To monitor and control the neutralisation process the lye can be mixed with an optical pH indicator which indicates the attainment of the desired pH value when the mixed fluids from the first and second containers 8, 9, have reached the desired pH value, e.g. by a change of colour. Alternatively an electronic pH meter may also be provided. Flexibly designed pipe 12 enables work to be carried out easily on thickened edge area 6. For carrying out the method according to the invention it is of decisive important for a largely neutral environment to prevail before the repair patch is glued into removed area 4.

To remove the lumps of tar forming after the etching process as a result of decomposition of the resin matrix, a further container, not shown, is provided which serves to receive hydrogen peroxide ($H_2O_2$). The hydrogen peroxide is poured into contact body 11 after completion of the neutralisation at a temperature of approximately 350° C., thus effecting the oxidation of the tar lumps.

To enable overhead work to be carried out with repair stick 7, a piston system, by means of which the acid and the lye can be held or pressed against the action of gravity in the direction of contact body 11, can be provided in containers 8, 9, for example. The pistons can be fed automatically, for example, with a spindle or a compressed air cushion. Instead of membrane 13, which can be penetrated once, as a "valve", the connection between second container 9 and pipe 12 can also be made by means of a reclosable valve, which has a similar design to valve 10. The first and second containers 8, 9 also have venting devices, not shown in FIG. 3, in order to guarantee unhindered discharge of the lye and/or acid.

Contact body 11 is designed essentially as in a bell shape and has at least one peripheral elastic sealing lip 14 at its lower end in order to avoid uncontrolled escape of sulphuric acid beyond the intrinsically sealed working area defined by contact body 11. Contact body 11 defines the actual selective working area or the area of influence of the sulphuric acid on edge area 6, thereby dissolving the resin matrix of composite fibre component 1 in this area only. This etching method, acting selectively according to the invention on the area of fibre optic 3 to be exposed, results in at least the dissolution of the epoxy resin matrix of composite fibre component 1, whilst the carbon fibres used for reinforcement and fibre optic 3 remain unimpaired thereby—at least when pure, highly concentrated sulphuric acid is used.

After completion of the etching process, i.e. when fibre optic 3 to be exposed projects sufficiently from edge area 6 for the subsequent splicing process, the sulphuric acid is neutralised by means of the lye kept in first container 8 by opening valve 10. During the etching process contact body 11 can be guided essentially along double arrow 15 with sliding rotating movements through edge area 6. In this case it must be ensured that contact body 11 is pressed against composite fibre component 1 with sufficient contact force at all times to prevent the escape of sulphuric acid.

Unlike the design variant of a device for carrying out the method, shown in FIG. 3, the preparation or exposure of fibre optic 3 can also be achieved by means of the so-called plasma etching method.

Here use is made of suitable process gases which are capable of dissolving material particles from the composite CFRP component and transferring them into the gas phase. A possible device for carrying out the plasma etching process uses a bell, but compared to contact body 11 this bell has a larger volume. The bell is placed on the area to be removed so that it seals tightly, forming an intrinsically demarcated volume area. The bell is filled with an electrically conducting gas kept under low pressure. The gas, enriched with particles dissolved from the CFRP material, is sucked out of the bell and fresh process gas is fed correspondingly from the outside.

The area to be removed around the fibre optic to be exposed may also be masked in certain areas, i.e. covered with templates. If an electrical field of suitable geometry acts inside the bell, the removing action of the electrically conducting gas particles are directed more intensely, giving rise to a highly contoured removal result.

Alternatively the exposure of fibre optic 3 can also be achieved by means of a compact, directed flame (burner) of suitable size, or a high energy laser beam, as a result of which the surrounding plastic matrix is "burnt off".

Both during the plasma etching process and when a directed flame or a laser is used, the temperature in the repair area must in any case remain far below the temperature of decomposition of the epoxy resin matrix to avoid permanent damage to the CFRP structure. If necessary suitable cooling measures must be taken, for example by placing large area metal plates in the vicinity of the working area.

Figure 4:
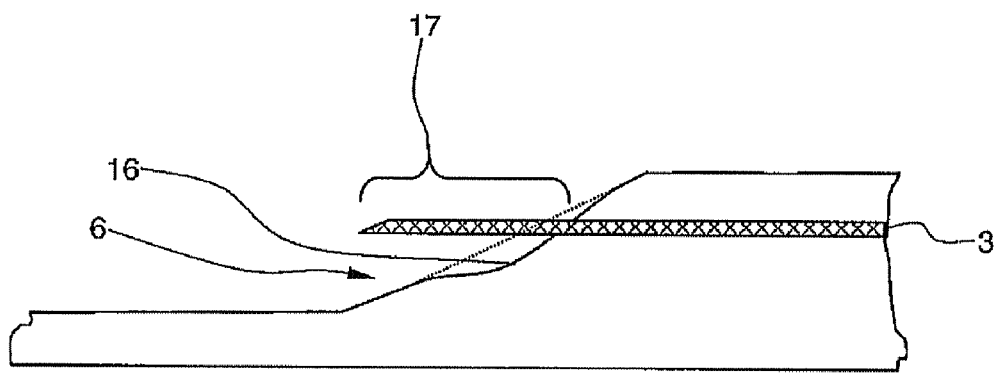
FIG. 4 shows the enlarged section from FIG. 2 with the exposed fibre optic in the edge area of the removal area of the composite fibre component.
Figure 5:
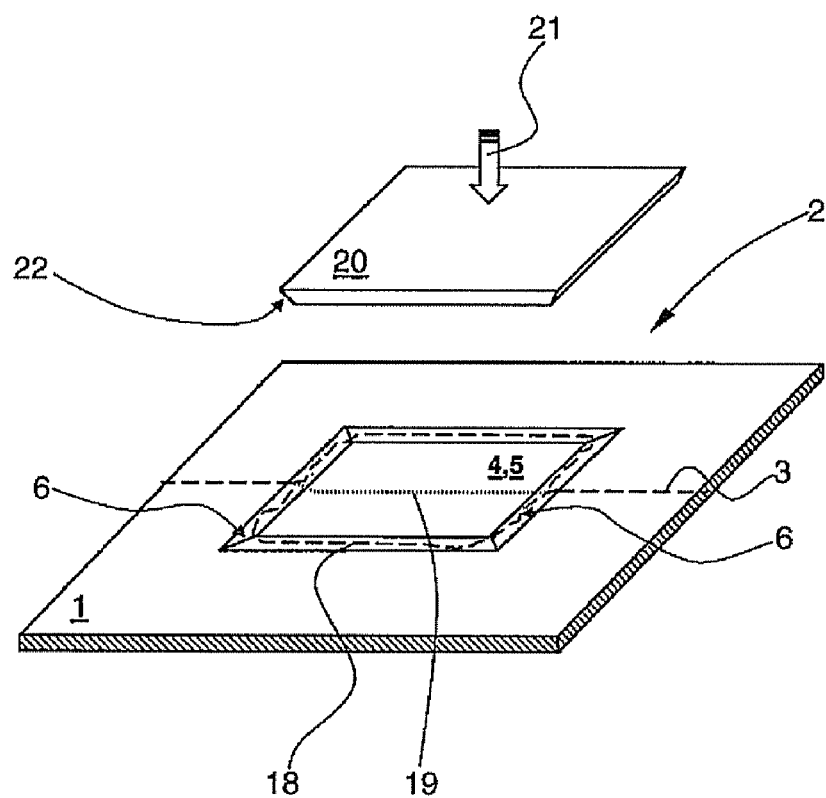

After the completion of the etching process, composite fibre component 1 has approximately the slightly curved (etched) contour development 16 shown in FIG. 4, and fibre optic 3 projects from edge area 6 over a length 17 which is sufficient for a process of splicing a bridging fibre optic. The operations of splicing in or on a bridging fibre optic 18 (cf. FIG. 5) is carried out by means of the method known from communications engineering.

In a further intermediate step of the inventive method it may be necessary to break off any carbon fibres not dissolved by the sulphuric acid in the area of fibre optic 3, or remove them by some other method and free the entire working area of repair stick 7 from any acid residues by a further intermediate cleaning step using suitable solvents or cleaning agents.

Splicing bridging fibre optic 18 in or on takes place in a subsequent method step. As can be seen in the representation in FIG. 5, bridging fibre optic 18 is laid essentially along edge area 6 of removed area 4 of composite fibre component 1. In this case it is of advantage, for position fixing, to glue bridging fibre optic 18, at least in sections, to edge area 6. Alternatively it is also conceivable to lay bridging fibre optic 18 over the shortest distance along the dotted secondary line 19 simply through removed area 4, on base area 5. Splicing in bridging fibre optic 18 gives rise to perfect "optical" contact of fibre optic 3 interrupted by damaged area 2.

After bridging fibre optic 18 is spliced in, a repair patch 20 is pressed and glued into removed area 4 in the direction of arrow 21 in a final method step. Repair patch 20 is such a geometrical shape that it is inserted as seamlessly as possible into removed area 4 of composite fibre component 1, thereby achieving maximum mechanical loading capacity and also as smooth and flat a surface as possible. In particular, an edge area 22 of repair patch 18 has the same thickening as removed area 4. The repair of damaged area 2 of composite fibre component 1 is therefore completed with full recovery of the functionality of fibre optic 3.

As an alternative to thickening, a repair patch overlapping the damaged area can also be provided. This repair patch, overlapping the repair patch or removed area 4, is preferably thickened in its outer edge area to avoid increases in stress. Because of the overlapping an adequate transmission of forces is ensured so that thickening in edge area 6 is no longer absolutely necessary. For a further reduction in the probability of failure of the repair point, the repair patch can also be riveted or otherwise mechanically connected in a fixed manner to the component to be repaired.

Figure 2:
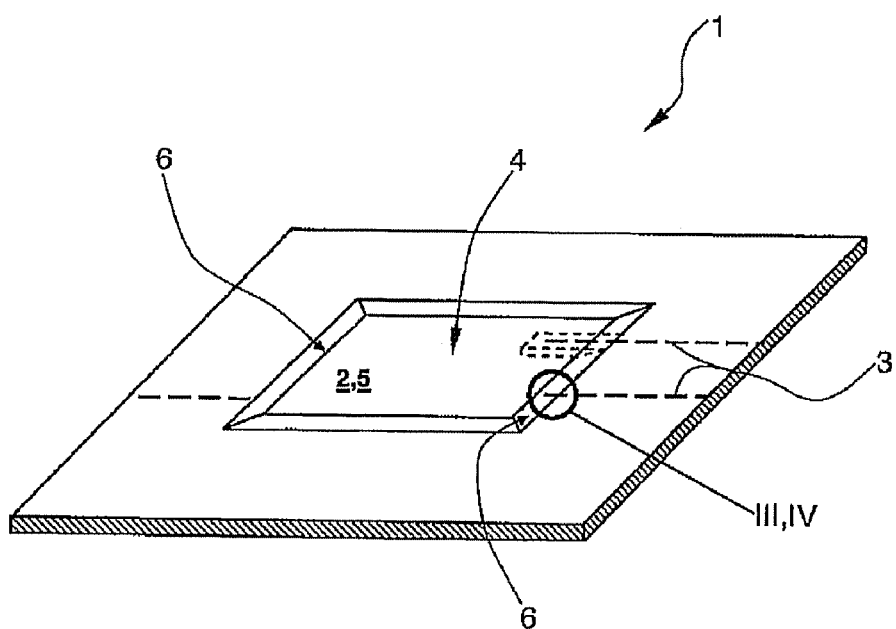
FIG. 2 shows the composite fibre component after the (mechanical) removal of the damaged area.

The step of removing damaged area 2 may, as shown in the representation in FIG. 2 by the contour of the bridge denoted by a dotted line, also take place in such a manner that as narrow a bridge as possible with fibre optic 3 embedded in it initially remains behind. The bridge is then removed by means of the inventive etching method to the extent that the reinforcing fibres and fibre optic 3 are exposed. The particular advantage of this is that a greater length of the fibre optic can be exposed compared to the procedure described above, in which the etching process only takes place in edge area 6, making it easier to splice in the bridging fibre optic. In addition, only a relatively small quantity of material of the composite fibre component need be dissolved by the relatively slow acting etching method.

The method according to the invention, in conformity with its intended purpose, need not be limited solely to repairs of composite fibre components with integrated fibre optic. Instead the method may also be used advantageously in the production of such components. For example it is possible to expose the fibre optic in the edge area of a composite fibre component by means of repair stick 7, thus preparing for the connection of optical plug connectors or plug connections. These plug connectors or connections are also spliced onto the fibre optic.

| LIST OF REFERENCE NUMERALS | | |
|---|---|---|
| 1 | Composite fibre component | |
| 2 | Damaged area | |
| 3 | Fibre optic | |
| 4 | Removed area | |
| 5 | Base area | } removed area |
| 6 | Edge area | |
| 7 | Repair stick | |
| 8 | First container | |
| 9 | Second container | |
| 10 | Valve | |
| 11 | Contact body | |
| 12 | Pipe | |
| 13 | Membrane | |
| 14 | Sealing lip | |
| 15 | Double arrow | |
| 16 | Contour development | |
| 17 | Length | |
| 18 | Bridging fibre optic | |
| 19 | Secondary line | |
| 20 | Repair patch | |
| 21 | Arrow | |
| 22 | Edge area (repair patch) | |

The invention claimed is:

1. A method for repairing a damaged composite fibre component of an aircraft having at least one integrated fibre optic, wherein said damaged area includes both a damaged composite structure and a damaged optical fibre, comprising:
  a) mechanically removing material from the damaged area, to form a removed area;
  b) exposing ends of the damaged composite fibre component in an edge area of the removed area;
  c) splicing in a bridging fibre optic portion for restoring an optical connection;
  d) laying the bridging fibre optic along an edge area of the removed area; and
  (e) pressing and gluing-in a repair patch into the removed area.

2. The method according to claim 1, wherein the mechanical removal is carried out by removing the damaged area while forming the edge area.

3. The method according to claim 1, wherein the surfaces of the edge area form an angle of inclination of less than 45° to a base area of the removed area.

4. The method according to claim 1, wherein the removed area is activated to improve the adhesion of the repair patch by means of one of a mechanical method, a chemical method, or a combination thereof.

5. The method according to claim 1, wherein the ends of the damaged composite fibre component are exposed selectively.

6. The method according to claim 1, wherein the composite fibre component is formed with a carbon fibre reinforced epoxy resin.

7. The method according to claim 1, wherein exposing the end of the damaged optical fibre is carried out by a chemical etching process.

8. The method according to claim 1, wherein exposing the end of the damaged optical fibre is carried out by a plasma etching process.

9. The method according to claim 1, wherein exposing the end of the damaged optical fibre is carried out by a burner.

10. The method according to claim 1, wherein exposing the end of the damaged optical fibre is carried out by a laser.

* * * * *